(12) United States Patent
Osada et al.

(10) Patent No.: US 8,173,318 B2
(45) Date of Patent: *May 8, 2012

(54) FUEL RESERVOIR FOR FUEL CELL

(75) Inventors: Takahiro Osada, Fujioka (JP); Yoshihisa Suda, Fujioka (JP); Toshimi Kamitani, Fujioka (JP); Kunitaka Yamada, Fujioka (JP); Kouji Nishimura, Fujioka (JP); Yasunari Kabasawa, Hamura (JP)

(73) Assignees: Mitsubishi Pencil Co., Ltd., Shinagawa-ku, Tokyo (JP); Casio Computer Co., Ltd., Shibuya-ku, Tokyo (JP)

( * ) Notice: Subject to any disclaimer, the term of this patent is extended or adjusted under 35 U.S.C. 154(b) by 1268 days.

This patent is subject to a terminal disclaimer.

(21) Appl. No.: 11/597,592

(22) PCT Filed: May 26, 2005

(86) PCT No.: PCT/JP2005/009661
§ 371 (c)(1),
(2), (4) Date: Jul. 17, 2007

(87) PCT Pub. No.: WO2005/117184
PCT Pub. Date: Dec. 8, 2005

(65) Prior Publication Data
US 2007/0259250 A1    Nov. 8, 2007

(30) Foreign Application Priority Data

May 27, 2004    (JP) .................................. 2004-158050

(51) Int. Cl.
*H01M 8/04*    (2006.01)

(52) U.S. Cl. ........................................ 429/447; 429/454
(58) Field of Classification Search ............ 429/12, 429/34, 36, 38, 447, 454, 482, 515
See application file for complete search history.

(56) References Cited

U.S. PATENT DOCUMENTS

| 5,364,711 | A | 11/1994 | Yamada et al. | |
| 5,432,023 | A | 7/1995 | Yamada et al. | |
| 6,506,513 | B1 | 1/2003 | Yonetsu et al. | |
| 6,874,999 | B2 * | 4/2005 | Dai et al. | 417/413.2 |
| 7,615,305 | B2 * | 11/2009 | Suda et al. | 429/405 |
| 2003/0082427 | A1 | 5/2003 | Prasad et al. | |
| 2004/0033146 | A1 | 2/2004 | Dai et al. | |

(Continued)

FOREIGN PATENT DOCUMENTS

EP    1087455 A2    3/2001

(Continued)

*Primary Examiner* — Cynthia H. Kelly
*Assistant Examiner* — Monique Wills
(74) *Attorney, Agent, or Firm* — Buchanan Ingersoll & Rooney PC

(57) ABSTRACT

The fuel reservoir for a fuel cell is a fuel reservoir detachably connected with a fuel cell main body, and it is equipped with a fuel-storing vessel of a tube type for storing a liquid fuel and a fuel discharge part; the fuel discharge part is provided with a valve for sealing communication between the inside and the outside of the above fuel-storing vessel; and a follower which seals the liquid fuel and moves as the liquid fuel is consumed is disposed in the rear end part of the liquid fuel stored. The valve assumes a structure in which a slit is formed in an elastic material and a structure in which a valve member is pressed by a resilient body.

15 Claims, 10 Drawing Sheets

U.S. PATENT DOCUMENTS

| | | |
|---|---|---|
| 2004/0126646 A1 | 7/2004 | Suda et al. |
| 2005/0116190 A1* | 6/2005 | Adams et al. ............. 251/144 |
| 2006/0151494 A1 | 7/2006 | Nakamura et al. |
| 2006/0172171 A1* | 8/2006 | Deinzer et al. ............ 429/34 |
| 2010/0175466 A1* | 7/2010 | Kabasawa ................. 73/149 |

FOREIGN PATENT DOCUMENTS

| | | |
|---|---|---|
| JP | 59-66066 A | 4/1984 |
| JP | 5-258760 A | 10/1993 |
| JP | 5-307970 A | 11/1993 |
| JP | 6-188008 A | 7/1994 |
| JP | 2001-93551 A | 4/2001 |
| JP | 2001-102069 A | 4/2001 |
| JP | 2004-63200 A | 2/2004 |
| JP | 2004-247136 A | 9/2004 |
| JP | 2005-32598 A | 2/2005 |
| JP | 2005-38803 A | 2/2005 |
| JP | 2005-228663 A | 8/2005 |
| WO | WO 2005/031903 A2 | 4/2005 |

* cited by examiner a b
φA c d e f g h (a)

(b)

FUEL RESERVOIR FOR FUEL CELL

TECHNICAL FIELD

The present invention relates to a fuel reservoir for a fuel cell, more specifically to a fuel reservoir suited to a small-sized fuel cell used as an electric power source for portable electronic appliances such as cellular phones, note type personal computers and PDA.

BACKGROUND ART

In general, a fuel cell comprises a cell on which an air electrode layer, an electrolyte layer and a fuel electrode layer are laminated, a fuel-supplying part for supplying fuel as a reducing agent to the fuel electrode layer and an air-supplying part for supplying air as an oxidizing agent to the air electrode layer, and it is an electric cell in which electrochemical reaction takes place between fuel and oxygen in the air in the cell to provide an electric power to the outside. Fuel cells of various types are developed.

In recent years, because of a rise in consciousness to environmental problems and energy saving, it is studied to use a fuel cell as a clean energy source for various uses. In particular, attentions are paid to fuel cells which can generate an electric power by only supplying directly a liquid fuel comprising methanol and water (refer to, for example, patent documents 1 and 2).

Among them, liquid fuel type fuel cells making use of capillary force for supplying a liquid fuel are known (refer to, for example, patent documents 3 and 4).

Liquid fuel type fuel cells described in the above respective patent documents supply a liquid fuel from a fuel tank to a fuel electrode by virtue of capillary force, and therefore they do not require a pump for sending a liquid fuel with pressure, so that they have merits in reducing a size.

However, such liquid fuel type fuel cells as merely making use of capillary force of a porous body and/or a fiber bundle disposed in a fuel reservoir are suited to reduction in a size in terms of constitution, but because fuel is supplied directly to a fuel electrode in the form of liquid, the fuel follows imperfectly during use over a long period of time under a use situation in which it is mounted in a small-sized portable appliances and in which the direction of a cell part is changed very often in every direction, and the trouble that the fuel is cut off from being supplied is brought about, so that it is difficult to supply constantly the fuel to the fuel electrode.

On the other hand, known as one of countermeasures for solving the above defects is a fuel cell system in which a liquid fuel is introduced into a cell by virtue of capillary force and in which the liquid fuel is then vaporized in a fuel-vaporizing layer and used (refer to, for example, patent document 5). However, it has the problem that poor followability of the fuel which is a fundamental problem is not improved, and involved therein is the problem that it is difficult to reduce a size of the fuel cell having the above structure because of a system in which a liquid is vaporized and then used as fuel.

As described above, in conventional fuel reservoirs for fuel cells, the existing situation is that a liquid fuel is instably supplied in supplying the fuel directly to a fuel electrode to cause fluctuation in an output value during operation and that it is difficult to reduce a size thereof to such an extent that they can be mounted in portable appliances while maintaining stable characteristics.

Patent document 1: Japanese Patent Application Laid-Open No. 258760/1993 (claims, examples and others)
Patent document 2: Japanese Patent Application Laid-Open No. 307970/1993 (claims, examples and others)
Patent document 3: Japanese Patent Application Laid-Open No. 66066/1984 (claims, examples and others)
Patent document 4: Japanese Patent Application Laid-Open No. 188008/1994 (claims, examples and others)
Patent document 5: Japanese Patent Application Laid-Open No. 102069/2001 (claims, examples and others)

DISCLOSURE OF THE INVENTION

Problems to be Solved by the Invention

In light of the problems and the existing situation in the conventional fuel reservoirs for fuel cells described above, the present invention has been made in order to solve them, and an object thereof is to provide a fuel reservoir for a fuel cell which allows a liquid fuel to be stably supplied directly to a fuel cell main body and enables the fuel cell to be reduced in a size and in which the liquid fuel is not lost in storing.

Means for Solving the Problems

Intensive studies on the conventional problems described above repeated by the present inventors have resulted in finding that a fuel reservoir for a fuel cell which meets the object described above is obtained by preparing a fuel reservoir detachably connected with a fuel cell main body, which is equipped with a fuel-storing vessel for storing a liquid fuel, a fuel discharge part having a specific structure and a follower which seals the liquid fuel at the rear end of the liquid fuel stored in the fuel-storing vessel and which moves as the liquid fuel is consumed, and thus the present invention has come to be completed.

That is, the present invention comprises the following items (1) to (14).

(1) A fuel reservoir for a fuel cell detachably connected with a fuel cell main body, wherein the fuel reservoir is equipped with a fuel-storing vessel for storing a liquid fuel, a fuel discharge part and a follower which seals the liquid fuel stored and which moves as the liquid fuel is consumed, and the fuel discharge part is equipped with a valve for sealing communication between the inside and the outside of the fuel-storing vessel.

(2) The fuel reservoir for a fuel cell as described in the above item (1), wherein the inside of the fuel-storing vessel described above is communicated with the fuel cell main body by inserting a liquid fuel-supplying member into the valve, whereby formed is a communicating part in which the liquid fuel in the inside of the fuel-storing vessel is supplied to the fuel cell main body.

(3) The fuel reservoir for a fuel cell as described in the above item (2), wherein the valve described above comprises an elastic material; the communicating part described above is a slit, and compressing force works in a direction in which the slit is closed.

(4) The fuel reservoir for a fuel cell as described in the above item (3), wherein the valve described above has an elliptic form in a cross section; a slit is provided in a minor axis direction of the valve; and a major axis of the valve is compressed to a shorter length than a length of the slit.

(5) The fuel reservoir for a fuel cell as described in the above item (4), wherein the valve having the elliptic form described above is pressed into an elliptic vessel having a shorter major axis than a major axis of the valve or a circular vessel having a shorter diameter than a major axis of the valve to compress a major axis direction of the valve.

(6) The fuel reservoir for a fuel cell as described in the above item (3), wherein the valve described above has a circular form in a cross section and is provided with a slit; the valve is pressed into an elliptic vessel having a shorter minor axis than a diameter of the valve so that a line formed by the slit is consistent with a major axis direction of the ellipse, whereby the direction rectangular to the slit is compressed to a shorter length than the original diameter of the valve.

(7) The fuel reservoir for a fuel cell as described in any one of the above items (5) to (6), wherein the vessel into which the valve described above is pressed is a valve-receiving part provided in the above fuel-storing vessel.

(8) The fuel reservoir for a fuel cell as described in any one of the above items (5) to (6), wherein the vessel into which the valve described above is pressed is a valve adaptor, and a composite in which the valve is installed in the valve adaptor is loaded in the fuel-storing vessel described above.

(9) The fuel reservoir for a fuel cell as described in any one of the above items (3) to (8), wherein the valve described above comprises a material having low gas permeability toward the liquid fuel described above and comprises a material having a compression set of 20% or less prescribed in JIS K 6262-1997.

(10) The fuel reservoir for a fuel cell as described in the above item (9), wherein the material of the valve described above is any of butyl rubber, halogenated butyl rubber and acrylonitrile-butadiene rubber.

(11) The fuel reservoir for a fuel cell as described in any one of the above items (2) to (10), wherein a convex projection is formed in the valve described above toward the inside of the fuel-storing vessel described above.

(12) The fuel reservoir for a fuel cell as described in the above item (2), wherein a valve member of the valve described above is closed by a resilient body and opened by inserting the liquid fuel-supplying member described above.

(13) The fuel reservoir for a fuel cell as described in any one of the above items (1) to (12), wherein the liquid fuel described above is at least one selected from the group consisting of a methanol solution, an ethanol solution, dimethyl ether (DME), formic acid, hydrazine, an ammonia solution, ethylene glycol, a saccharide aqueous solution and a sodium boron hydride aqueous solution.

(14) The fuel reservoir for a fuel cell as described in any one of the above items (1) to (13), wherein the fuel cell main body assumes a structure in which plural unit cells each of which is formed by constructing an electrolyte layer on the outer surface of a fuel electrode body and constructing an air electrode layer on the outer surface of the electrolyte layer are joined and in which the fuel-supplying member connected with the fuel reservoir is connected with the unit cell to supply the liquid fuel.

Effects of the Invention

According to the present invention, provided is a fuel reservoir for a fuel cell which can stably supply a liquid fuel and does not have loss of the liquid fuel in storing and which enables the fuel cell to reduce a size.

Further, according to the present invention, obtained is a fuel reservoir for a fuel cell in which a liquid fuel is more effectively prevented from leaking.

Figure 1:
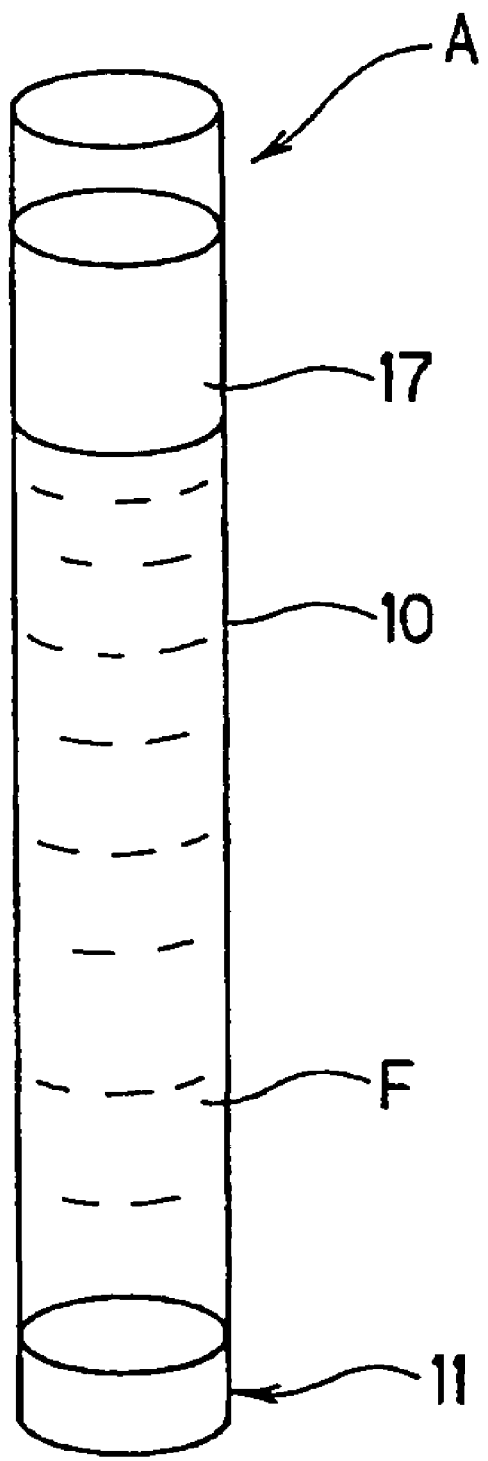
FIG. 1 is an outline perspective drawing showing the fuel reservoir for a fuel cell of the first embodiment according to the present invention.

| List of Reference Numerals and Letters | |
|---|---|
| A: | Fuel reservoir for a fuel cell |
| F: | Liquid fuel |
| 10: | Fuel-storing vessel |
| 11: | Fuel discharge part |
| 12: | Valve |
| 17: | Follower |

BEST MODE FOR CARRYING OUT THE INVENTION

The embodiment of the present invention shall be explained below in details with reference to the drawings.

Figure 2:
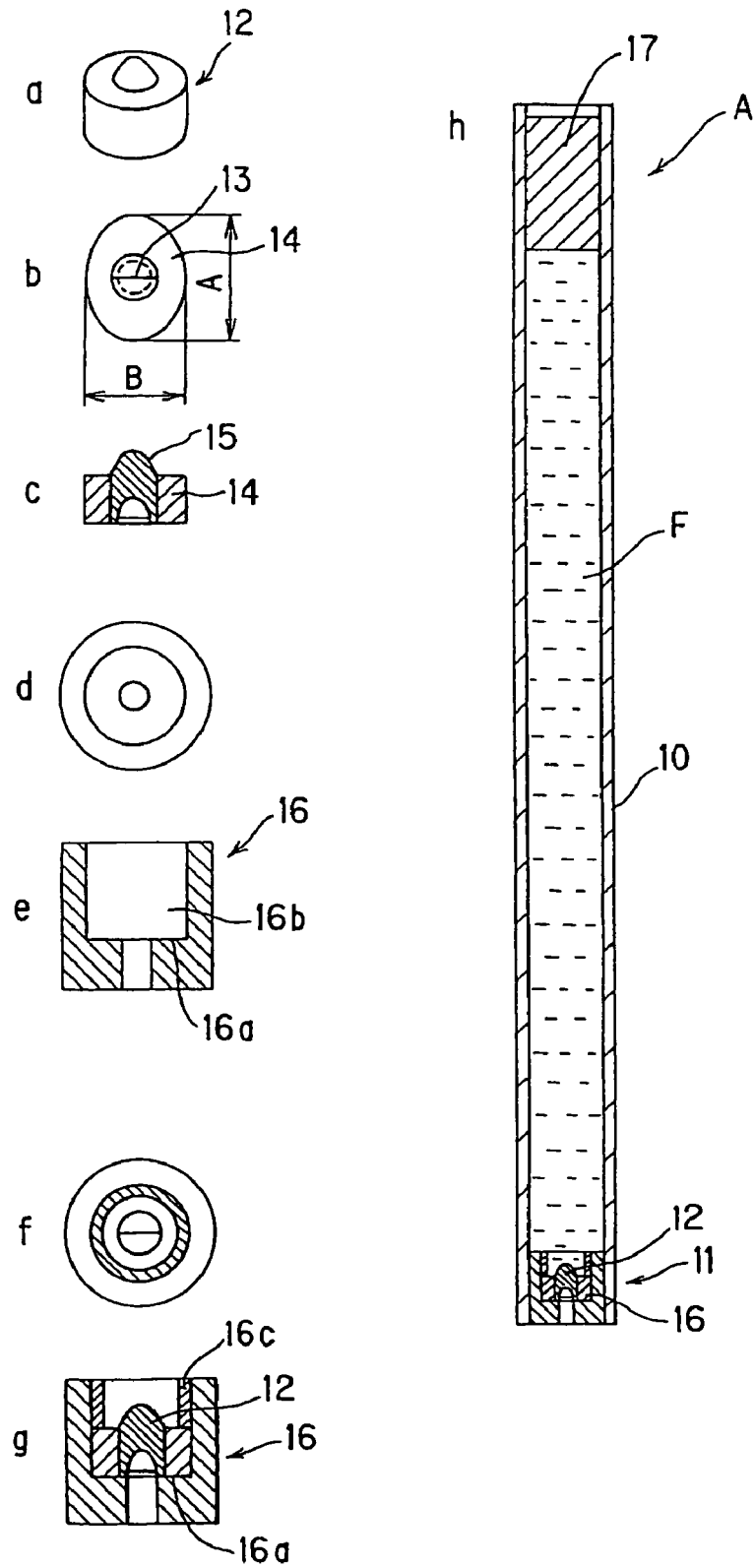
FIG. 2 (*a*) to (*h*) show the structure of a valve provided in the fuel discharge part of the first embodiment according to the present invention, wherein (a) is a perspective drawing of the valve; (b) is a plain view of the valve; (c) is a vertical cross-sectional drawing of the valve; (d) is a plain view of an adaptor; (e) is a vertical cross-sectional drawing of the adaptor; (f) is a plain view of a state in which the valve is installed in the adaptor; (g) is a vertical cross-sectional drawing of a state in which the valve is installed in the adaptor; and (h) is a vertical cross-sectional drawing of the fuel reservoir.
Figure 3:
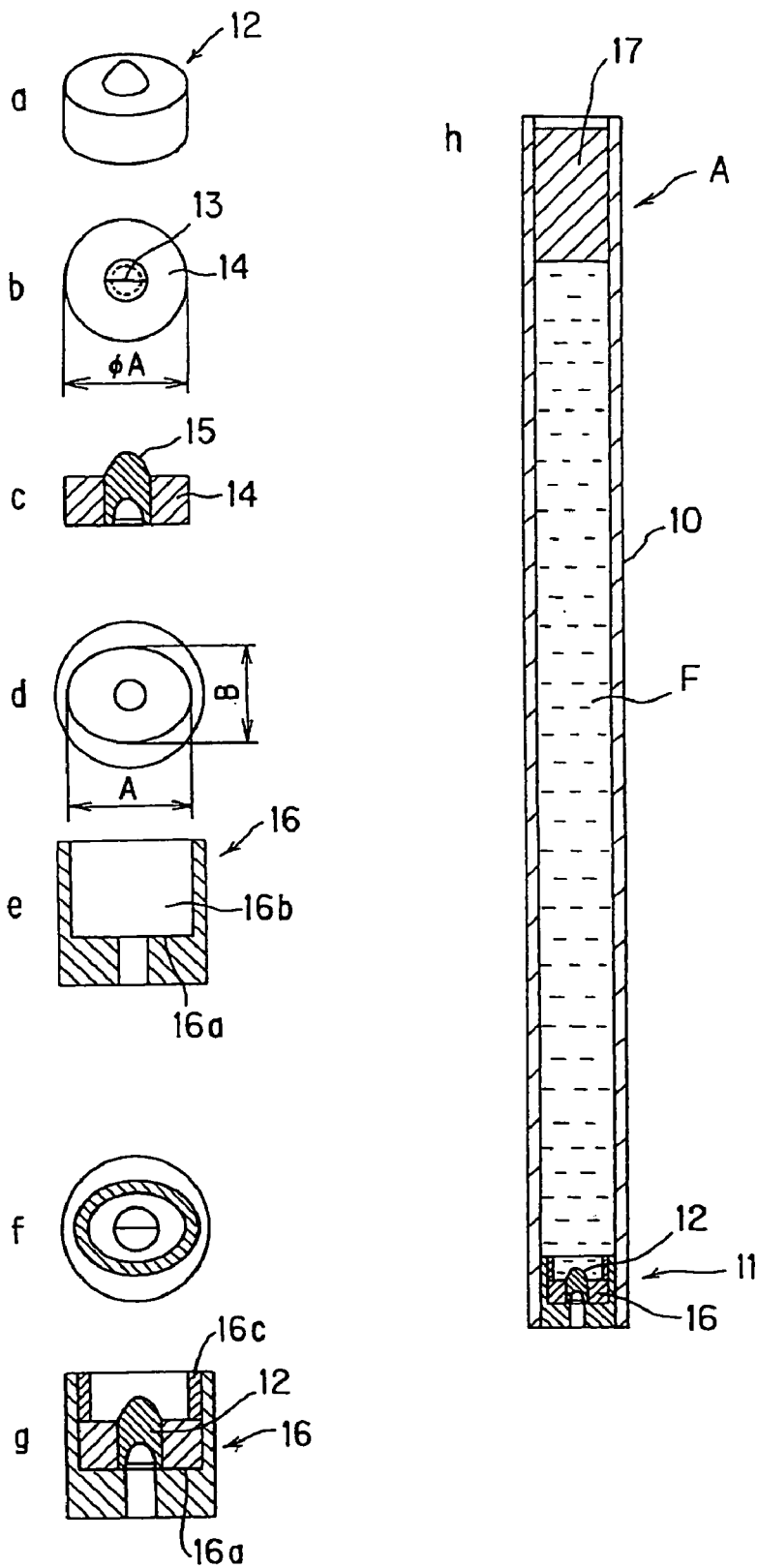
FIG. 3 (*a*) to (*h*) show the structure of a valve installed in the fuel discharge part of the first embodiment according to the present invention, wherein (a) is a perspective drawing of the valve; (b) is a plain view of the valve; (c) is a vertical cross-sectional drawing of the valve; (d) is a plain view of an adaptor; (e) is a vertical cross-sectional drawing of the adaptor; (f) is a plain view of a state in which the valve is installed in the adaptor; (g) is a vertical cross-sectional drawing of a state in which the valve is installed in the adaptor; and (h) is a vertical cross-sectional drawing showing an outline of the fuel reservoir.

FIG. 1 to FIG. 3 show a fundamental aspect (first embodiment) of a fuel reservoir for a fuel cell A showing the fundamental embodiment of the present invention.

The fuel reservoir for a fuel cell A of the present first embodiment is a fuel reservoir detachably connected with a fuel cell main body, and it is provided with a fuel-storing vessel 10 of a tube type (cylindrical) for storing a liquid fuel F and a fuel discharge part 11 at the lower end part of the fuel-storing vessel 10. The fuel discharge part 11 is equipped with a valve 12 for sealing communication between the inside and the outside of the fuel-storing vessel 10, and a follower 17 which seals the liquid fuel F and moves as the liquid fuel F is consumed is provided at the rear end of the liquid fuel F.

The fuel-storing vessel 10 of a tube type described above is preferably constituted from a material having storage stability and durability against a liquid fuel stored therein, a gas non-permeating property (gas non-permeating property against oxygen gas, nitrogen gas and the like) and light transmittance so that the remaining amount of the liquid fuel can visually be observed.

The material of the fuel-storing vessel 10 includes, for example, metals such as aluminum and stainless steel, synthetic resins and glass when light transmittance is not required, and from the viewpoints of visibility of the remaining amount of the liquid fuel described above, a gas non-permeating property, reduction in a cost in producing and assembling and easiness of production, the fuel-storing vessel is preferably constituted from a single layer structure and a multilayer structure comprising a single kind or two or more kinds of resins such as polypropylene, polyvinyl alcohol, ethylene•vinyl alcohol copolymers (EVOH), polyacrylonitrile, nylon, cellophane, polyethylene terephthalate, polycarbonate, polystyrene, polyvinylidene chloride and polyvinyl chloride each having the respective characteristics described above. In the case of the multilayer structure, as long as at least one layer is constituted from a resin having the performances described above (the gas non-permeating property and the like), there are no problems in terms of actual use even if the remaining layers are constituted from ordinary resins. Such tubes having a multilayer structure can be produced by extrusion molding, injection molding and co-extrusion molding.

The fuel discharge part 11 is equipped with a valve 12 for sealing communication between the inside and the outside of the cylindrical fuel-storing vessel 10, and assumed in the present embodiment is a structure in which the valve 12 is installed in the fuel discharge part 11 directly or via a valve adaptor. This valve assumes the same structure as that of a member used in writing instruments, and the liquid fuel F stored directly in the cylindrical fuel-storing vessel 10 is protected, as shown in FIG. 2 (a) to (c), from foreign matters such as air coming from the periphery of a fuel-supplying tube described later due to a change in barometric pressure and temperature.

The valve 12 is provided with a communicating part 13 comprising a linear slit for supplying the liquid fuel F in the inside of the fuel-storing vessel 10 to the outside, which allows to communicate between the inside and the outside of the fuel-storing vessel 10 by inserting a liquid fuel-supplying member. In addition thereto, when the valve 12 is installed in the fuel discharge part 11 or the valve adaptor each described above, the valve 12 is compressed to an axis direction by a valve outer peripheral part 14, whereby compressing force works on the communicating part 13 described above. In the present embodiment, the valve is elliptic as shown in FIG. 2 (b); a slit 13 which is a communicating part is provided in a minor axis direction; the outer periphery part 14 is compressed in a major axis direction; and the compressing force works in a direction in which the slit 13 is closed.

The communicating part 13 is formed by a linear slit, and it shall not specifically be restricted as long as it assumes a structure in which the fuel-storing vessel 10 can be communicated by inserting a liquid fuel-supplying member to supply the liquid fuel F in the fuel-storing vessel 10 to the outside. It may be a cross-shaped or radial slit, a structure in which plural slits are formed so that the respective slits are crossed in the same spot, a circular hole or a rectangular hole. It is preferably the linear slit described above. The shape of the outer peripheral part 14 shall not specifically be restricted, and it can be formed in a circular shape as well as an elliptical shape as is the case with the embodiment described above.

A convex tapered face (projection) 15 is preferably formed on the inner face side of the valve 12 toward the inside of the fuel-storing vessel 10 so that the liquid fuel-supplying member can smoothly be inserted when inserting it.

The fuel discharge part 11 described above is equipped with an adaptor 16 shown in FIGS. 2 (d), (e), and the adaptor 16 is formed in a cylindrical shape and comprises a main body part 16b in which a stopper part 16a is formed on an inner peripheral face and a fixing member 16c which is formed in a cylindrical shape. The valve 12 having the construction described above is interposed between the stopper part 16a and the fixing member 16c.

The combination of the valve 12 and the adaptor 16 includes a case of an elliptical slit valve and a circular adaptor (FIG. 2) and a case of a circular slit valve and an elliptical adaptor (FIG. 3). In the case of the latter, a slit direction of the slit valve has to be consistent with that of the major axis of the adaptor.

The valve 12 having the structure described above assumes a structure in which foreign matters such as air are prevented from coming in during suspending use (no use) thereof. This is to prevent troubles such as leaking and blowing of the fuel caused by increase of a pressure in the liquid fuel-storing vessel 10 which is brought about by coming in of air.

The valve 12 and the adaptor 16 are preferably, from the viewpoint of preventing more effectively leaking of the liquid fuel, those which have the structures described above and comprise materials having low gas permeability toward the liquid fuel F and which are constituted from materials having a compression set of 20% or less prescribed in JIS K 6262-1997.

The materials for the above valve 12 and adaptor 16 shall not specifically be restricted as long as they have storage stability, durability against the liquid fuel F stored and gas non-permeability and elasticity by which the valve and the adaptor can be fixed tightly to the fuel-supplying tube and have the characteristics described above. They include synthetic resins such as polyvinyl alcohol, ethylene•vinyl alcohol copolymer resins, polyacrylonitrile, nylon, cellophane, polyethylene terephthalate, polycarbonate, polystyrene, polyvinylidene chloride and polyvinyl chloride, rubbers such as natural rubber, isoprene rubber, butadiene rubber, acrylonitrile-butadiene rubber, 1,2-polybutadiene rubber, styrene-butadiene rubber, chloroprene rubber, nitrile rubber, butyl rubber, ethylene-propylene rubber, chlorosulfonated polyethylene rubber, acryl rubber, epichlorohydrin rubber, polysulfide rubber, silicone rubber, fluorocarbon rubber and urethane rubber and thermoplastic elastomers. They can be produced by conventional injection molding and vulcanizing molding.

The liquid fuel F used includes a methanol solution comprising methanol and water, but the liquid fuel shall not specifically be restricted as long as hydrogen ions ($H^+$) and electrons ($e^-$) are efficiently obtained from a compound supplied as fuel at a fuel electrode body described later. Liquid fuels such as dimethyl ether (DME), an ethanol solution, formic acid, hydrazine, an ammonia solution, ethylene glycol, a saccharide aqueous solution and a sodium boron hydride aqueous solution can be used as well, though depending on the structure of the fuel electrode body.

The above liquid fuels having various concentrations can be used according to the structure and the characteristics of the fuel cell, and the liquid fuels having a concentration of, for example, 1 to 100% can be used.

The follower 17 is brought into contact with the rear end of the liquid fuel F stored in the fuel-storing vessel 10 to seal the liquid fuel F, and it moves as the fuel is consumed. It prevents the liquid fuel in the fuel-storing vessel 10 from leaking and vaporizing, and it prevents air from coming into the liquid fuel.

This follower 17 is required not to be dissolved or diffused in the liquid fuel F. If it is dissolved or diffused in the liquid fuel F, the liquid fuel in the fuel-storing vessel 10 which is a fuel storing tank leaks and vaporizes from an air open side at the rear end thereof, and not only the fuel-storing vessel does not play a role as a fuel storing tank, but also a substance constituting the follower 17 comes into the fuel electrode of the fuel cell main body together with the liquid fuel F to exert an adverse effect on the reaction in a certain case. The preferred characteristics of the follower 17 used in the present invention are selected taking these conditions into consideration.

The follower 17 which can be used shall not specifically be restricted as long as it has the characteristics described above, and capable of being given are, for example, petroleums such as mineral oil, polyglycol, polyester, polybutene, silicone oils, and those in which a viscosity is increased by mixing solvents with aliphatic metallic soaps, modified clay, silica gel, carbon black, natural or synthetic rubbers, or various synthetic polymers.

The preferred follower 17 has a lower surface free energy than that of the liquid fuel F, whereby like the cases of the fuel-storing vessel 10 and the valve 12 each described above, possibility in which the liquid fuel can be prevented from coming into gaps between the fuel-storing vessel 10 and the follower 17 and leaking to the outside can be enhanced. In light of the above conditions, the material and the surface state of the follower 17 are suitably selected.

Further, a follower auxiliary member constituted from a synthetic resin and an elastic material may be provided between the follower 17 and the liquid fuel F in order to prevent reversion of the follower 17 and the liquid fuel F.

Figure 7:
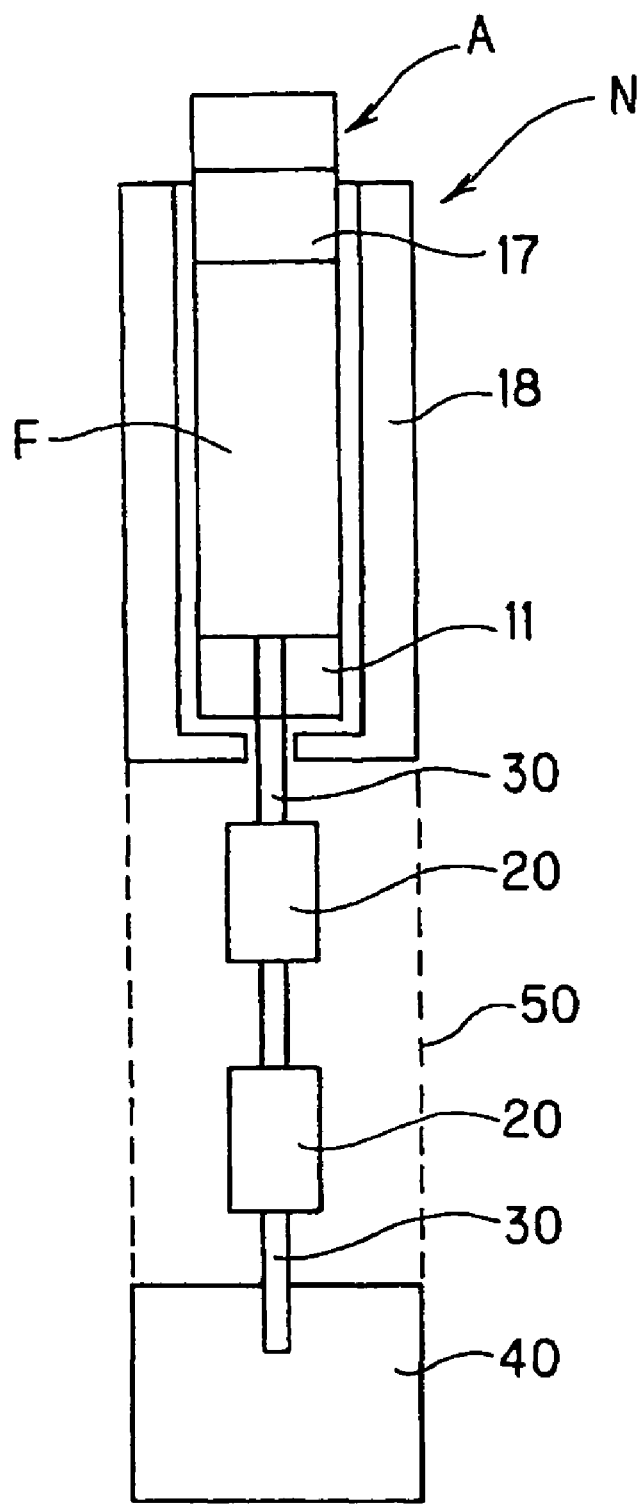
FIG. 7 is an outline vertical cross-sectional drawing showing one example of a state in which the fuel reservoir for a fuel cell of FIG. 1 is connected to the fuel cell main body and used as a fuel cell.
Figure 8:
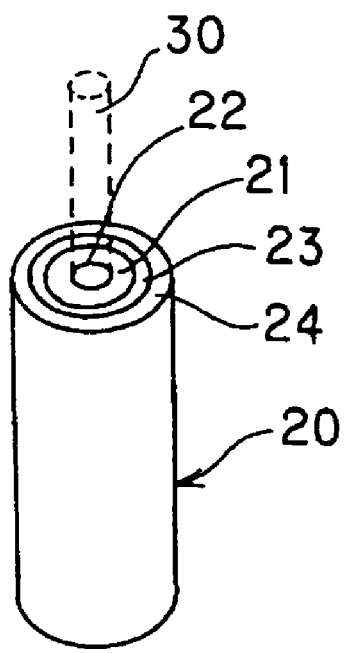
FIGS. 8 (*a*) and (*b*) are a perspective drawing and a vertical cross-sectional drawing which explain a unit cell of a fuel-cell.
Figure 8:
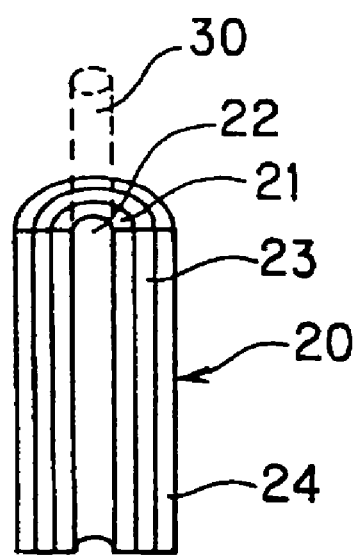

This fuel reservoir for a fuel cell A is, as shown in FIG. 7 and FIG. 8, detachably connected with the fuel cell main body N and used.

That is, the fuel cell main body N is equipped, as shown in FIG. 7 and FIG. 8, with unit cells (fuel-cell unit) 20, 20 formed by constructing an electrolyte layer 23 on the outer surface of a fuel electrode body 21 comprising a fine porous carbonaceous body and constructing an air electrode layer 24 on the outer surface of the electrolyte layer 23, a fuel-supplying member 30 having a penetrating structure connected with a fuel reservoir A and a used-fuel storing tank 40 provided at an end of the fuel-supplying member 30. The respective unit cells 20, 20 described above are joined in series, and the fuel is supplied in order by means of the fuel-supplying member 30. The fuel reservoir A described above assumes an exchangeable cartridge structure and is inserted into a supporter part 18 in the fuel cell main body N.

In this embodiment, the liquid fuel F is directly stored as shown in FIG. 1, FIG. 2(h), FIG. 3(h) and FIG. 7, and the fuel F is supplied by means of the fuel-supplying member 30 inserted into the valve 12 which is installed in a fuel discharge part 11 at a lower part of the fuel-storing vessel 10 for storing the liquid fuel F.

In supplying the fuel, the follower moves as the fuel is discharged in this fuel reservoir to follow a change in a volume of the fuel (reduction in the volume), and therefore air does not come into the fuel-storing vessel.

The valve 12 and the fuel-supplying member 30 which are installed in the fuel-storing vessel 10 and the fuel discharge part 11 of the fuel reservoir A are connected respectively with interfitting. In this case, if the respective members have a higher surface free energy than that of the liquid fuel F, the liquid fuel is liable to get into gaps at the junction, and the possibility that the liquid fuel F leaks is enhanced. Accordingly, a surface free energy of the above members is preferably controlled to a lower level than that of the liquid fuel F at least on a surface brought into contact with the liquid fuel F. In respect to a method for controlling this, the surface of the fuel-storing vessel 10 brought into contact with the liquid fuel F can be subjected to water repellent film-forming treatment by coating a water repellent agent of a silicone base or a fluorine base.

The respective unit cells 20 have, as shown in FIGS. 8(a) and (b), the fuel electrode body 21 comprising a fine porous carbonaceous pillar body and in addition thereto, have a through part 22 in a central part thereof through which the fuel-supplying member 30 passes, and they assume a structure in which the electrolyte layer 23 is constructed on the outer surface of the fuel electrode body 21 and in which the air electrode layer 24 is constructed on the outer surface of the electrolyte layer 23. The respective unit cells 20 generate an electromotive force of about 1.2 V per cell in theory.

The fine porous carbonaceous pillar body constituting the fuel electrode body 21 may be any one as long as they are porous structures having fine communication holes, and it includes, for example, carbon composite molded articles which comprise a three-dimensional network structure or a point sintered structure and which are constructed from amorphous carbon and carbon powder, isotropic high density carbon molded articles, carbon fiber paper-making molded articles and activated carbon molded articles, and the carbon composite molded articles which comprise amorphous carbon and carbon powder and which have fine communication holes are preferred from the viewpoint of easiness in controlling the reaction in the fuel electrode of the fuel cell and a further rise in the reaction efficiency.

The carbon powder used for producing the above carbon composite body comprising a porous structure is preferably at least one (alone or combination of two or more kinds thereof) selected from highly oriented pyrolytic graphite (HOPG), kish graphite, natural graphite, artificial graphite, carbon nanotube and fullerene.

A platinum-ruthenium (Pt—Ru) catalyst, an iridium-ruthenium (Ir—Ru) catalyst and a platinum-tin (Pt—Sn) catalyst are formed on the outer surface of the fuel electrode body 21 by a method in which a solution containing the above metal ions or a metal fine particle precursor such as metal complexes is subjected to impregnating or dipping treatment and then subjected to reducing treatment and an electrodeposition method of metal fine particles.

The electrolyte layer 23 includes ion exchange membranes having proton conductivity or hydroxide ion conductivity, for example, fluorine base ion exchange membranes including Nafion (manufactured by Du Pont Co., Ltd.), and in addition thereto, it includes membranes in which heat resistance and inhibition in methanol crossover are good, for example, composite membranes comprising an inorganic compound as a proton conducting material and a polymer as the membrane material, to be specific, composite membranes using zeolite as the inorganic compound and styrene-butadiene base rubber as the polymer, and hydrocarbon base graft membranes.

The air electrode layer 24 includes porous carbonaceous bodies on which platinum (Pt), palladium (Pd) and rhodium (Rh) are carried by a method using a solution containing the metal fine particle precursor described above and which comprise a porous structure.

The fuel-supplying member 30 shall not specifically be restricted as long as it can be inserted into the valve 12 in the fuel reservoir A and has a penetrating structure to supply the liquid fuel F to the respective unit cells 20, and it includes, for example, porous bodies having capillary force comprising felts, sponges, those which are constituted from sintered bodies such as resin particle-sintered bodies and resin fiber-sintered bodies and fiber bundles comprising one or combination of two or more kinds of natural fibers, animal fibers, polyacetal base resins, acryl base resins, polyester base resins, polyamide base resins, polyurethane base resins, polyolefin base resins, polyvinyl base resins, polycarbonate base resins, polyether base resins and polyphenylene base resins. A porosity of the above porous bodies and fiber bundles is suitably set according to a supplying amount of the liquid fuel to the respective unit cells 20.

The used-fuel storing tank 40 is disposed at an end of the fuel-supplying member 30. In this case, it provides no problems to bring the used-fuel storing tank 40 into direct contact with the end of the fuel-supplying member 30 to occlude the used-fuel directly in an occlusion body, and a sliver, a porous body or a fiber bundle may be provided as a feed at a junction brought into contact with the fuel-supplying member 30 to set it as a discharge passage for the used fuel.

The liquid fuel supplied by the fuel-supplying member 30 is used for the reaction in the unit cell 20, and since a fuel-supplying amount is linked with a fuel-consuming amount, the liquid fuel which is discharged to the outside of the cell without reacting is scarcely found, so that a treating system is not required at the fuel outlet side as is the case with conventional liquid fuel type fuel cells. However, assumed is a structure in which when the fuel comes to be supplied in excess depending on an operation status, the liquid fuel which is not used for the reaction can be stored in the storing tank 40 to prevent an adverse effect from being exerted on the reaction in the electrode.

In FIG. 7, numeral 50 is a member comprising a mesh structure which joins the fuel reservoir A with the used-fuel storing tank 40 and which enables the liquid fuel to be surely supplied from the fuel-storing vessel 10 directly to each of the respective unit cells 20, 20 via the fuel-supplying member 30.

In the fuel cell using the fuel reservoir A thus constituted, the liquid fuel is supplied from the fuel reservoir A to the fuel-supplying member 30 inserted into the valve 12 in the fuel discharge part and introduced into the respective unit cells 20, 20 by virtue of the penetrating structure.

In the present invention, the fuel reservoir A detachably connected with the fuel cell main body is equipped with the fuel-storing vessel 10 of a tube type for storing the liquid fuel F and the fuel discharge part 11, and the fuel discharge part 11 is provided with the valve 12 for sealing communication between the inside and the outside of the fuel-storing vessel 10, so that provided is the fuel reservoir for a fuel cell which does not lose the liquid fuel in storage and stably supplies the liquid fuel F directly to the fuel cell main body N and which can reduce a size of the fuel cell.

In the embodiment described above, provided is the valve 12 for sealing communication between the inside and the outside of the fuel-storing vessel 10, that is, one into which the liquid fuel-supplying member 30 is inserted, whereby the fuel-storing vessel 10 is communicated between the inside and the outside to form a communicating part 13 for supplying the liquid fuel F in the inside of the fuel-storing vessel 10 to the outside. When the valve 12 is installed in the fuel discharge part 11, the valve 12 is compressed to an axis direction by the outer periphery part 14 of the valve, whereby compressing force is exerted on the communicating part 13, so that the liquid fuel F can more effectively be prevented from leaking from the communicating part 13. Also, the fuel-storing vessel 10 is provided with an adaptor 16 to assume a structure in which the valve 12 is interposed between a stopper part 16a and a fixing member 16c in the adaptor 16 and which is easily assembled, so that the valve 12 can stably be fixed in the fuel discharge part 11 provided in the storing vessel 10.

Further, a follower 17 which seals the liquid fuel F and moves as the fuel is consumed is disposed at the rear end of the liquid fuel F, and the follower 17 moves as the fuel is consumed with generating electric power by the fuel cell to follow reduction in a volume of the liquid fuel. In addition thereto, even when the fuel reservoir (liquid fuel) is heated by operation of the fuel cell, it can follow expansion in the volume by moving.

The fuel-storing vessel is not substituted with air as the fuel is discharged, and therefore even if the fuel discharge part is turned upward in a state in which the fuel is discharged to some extent, the fuel can be discharged well since the fuel is always brought into contact with the fuel discharge part.

In the embodiment described above, capillary force is present at least in the fuel electrode body 21 and/or the fuel-supplying member 30 brought into contact with the fuel electrode body 21, and this capillary force makes it possible to supply stably and continuously the fuel directly from the fuel-storing vessel 10 to each of the unit cells 20, 20 without bringing about back flow and interruption. More preferably, setting capillary force of the used-fuel storing tank 40 to be larger than capillary force present in the fuel electrode body 21 and/or the fuel-supplying member 30 brought into contact with the fuel electrode body 21 makes it possible to discharge stably and continuously the liquid fuel directly from the fuel-storing vessel 10 and the respective unit cells 20, 20 up to the used-fuel storing tank without bringing about back flow and interruption.

Further, assumed in the above fuel cell is a structure in which the liquid fuel can smoothly be supplied as it is without vaporizing the liquid fuel without using specifically auxiliary appliances such as a pump, a blower, a fuel carburetor and a condenser, and therefore it becomes possible to reduce a size of the fuel cell.

Accordingly, in the fuel cell of the above embodiment, it becomes possible to turn the whole part of the fuel cell into a cartridge, and provided is the small-sized fuel cell which can be used as an electric power source for portable electronic appliances such as cellular phones and note type personal computers.

In the embodiment described above, a structure in which two unit cells 20 of the fuel-cell are used has been shown, and a required electromotive force can be obtained by increasing the number of the unit cells 20 joined (in series or parallel) according to the use purposes of the fuel cell.

Figure 4:
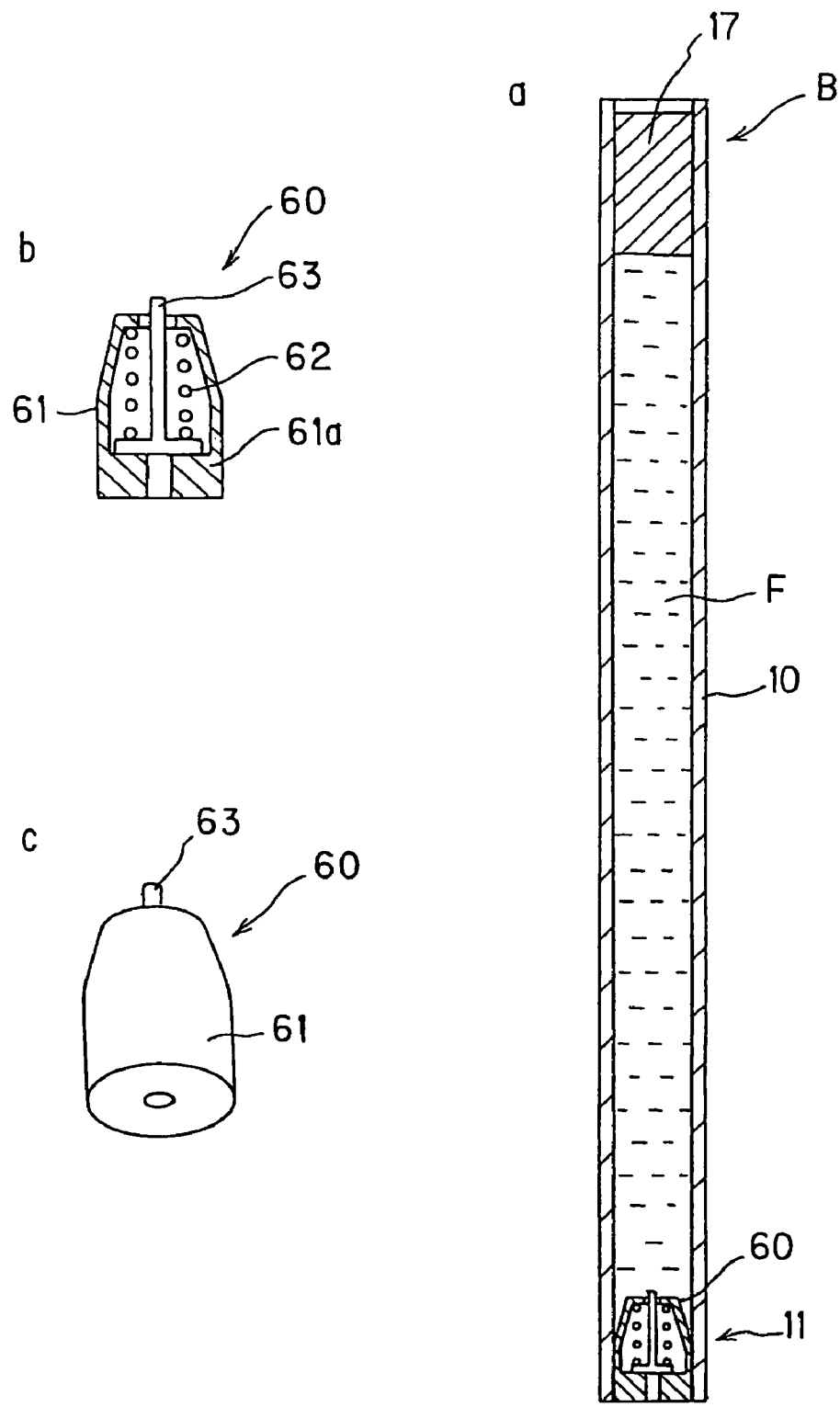
FIG. 4 (*a*) to (*c*) show the fuel reservoir for a fuel cell of the second embodiment according to the present invention, wherein (a) is an outline cross-sectional drawing shown in a vertical cross-sectional aspect; (b) is a vertical cross-sectional drawing of the valve; and (c) is a perspective drawing thereof.

FIG. 4 shows another embodiment (second embodiment) of the fuel reservoir for a fuel cell according to the present invention. In the following embodiment, a fuel reservoir having the same structure and exhibiting the same effects as those of the fuel reservoir for a fuel cell of the first embodiment described above shall be given the same reference numerals as in FIG. 1, and the explanations thereof shall be omitted.

The fuel reservoir for a fuel cell B of this second embodiment is different, as shown in FIG. 4(a) to (c), from the first embodiment only in that the valve having the slit of the first embodiment is changed to a valve having a structure in which it is closed by a resilient body such as a spring member and opened by inserting a liquid fuel-supplying member.

This valve 60 has a valve-receiving part 61a in a main body 61, and assumed is a structure in which a valve member 63 having a reverse T-shape in a cross-section is always pressed to the valve-receiving part 61a by an elastic body 62 such as a spring member to close the valve and in which it is opened by inserting a liquid fuel-supplying member 30 to supply a liquid fuel.

In the fuel cell using the fuel reservoir B thus constituted, the liquid fuel is supplied, as is the case with the first embodiment described above, from the fuel reservoir B to the fuel-supplying member 30 inserted into the valve 60 in the fuel discharge part, and then it is introduced into unit cells 20, 20 of by virtue of a penetrating structure.

In the above embodiment, the fuel reservoir B detachably connected with the fuel cell main body is equipped with a fuel-storing vessel 10 of a tube type for storing a liquid fuel F and a fuel discharge part 11, and the fuel discharge part 11 is provided with the valve 60 for sealing communication between the inside and the outside of the fuel-storing vessel 10, so that provided is the fuel reservoir for a fuel cell which does not lose the liquid fuel in storage and stably supplies the liquid fuel F directly to a fuel cell main body N and which can reduce a size of the fuel cell.

Figure 9:
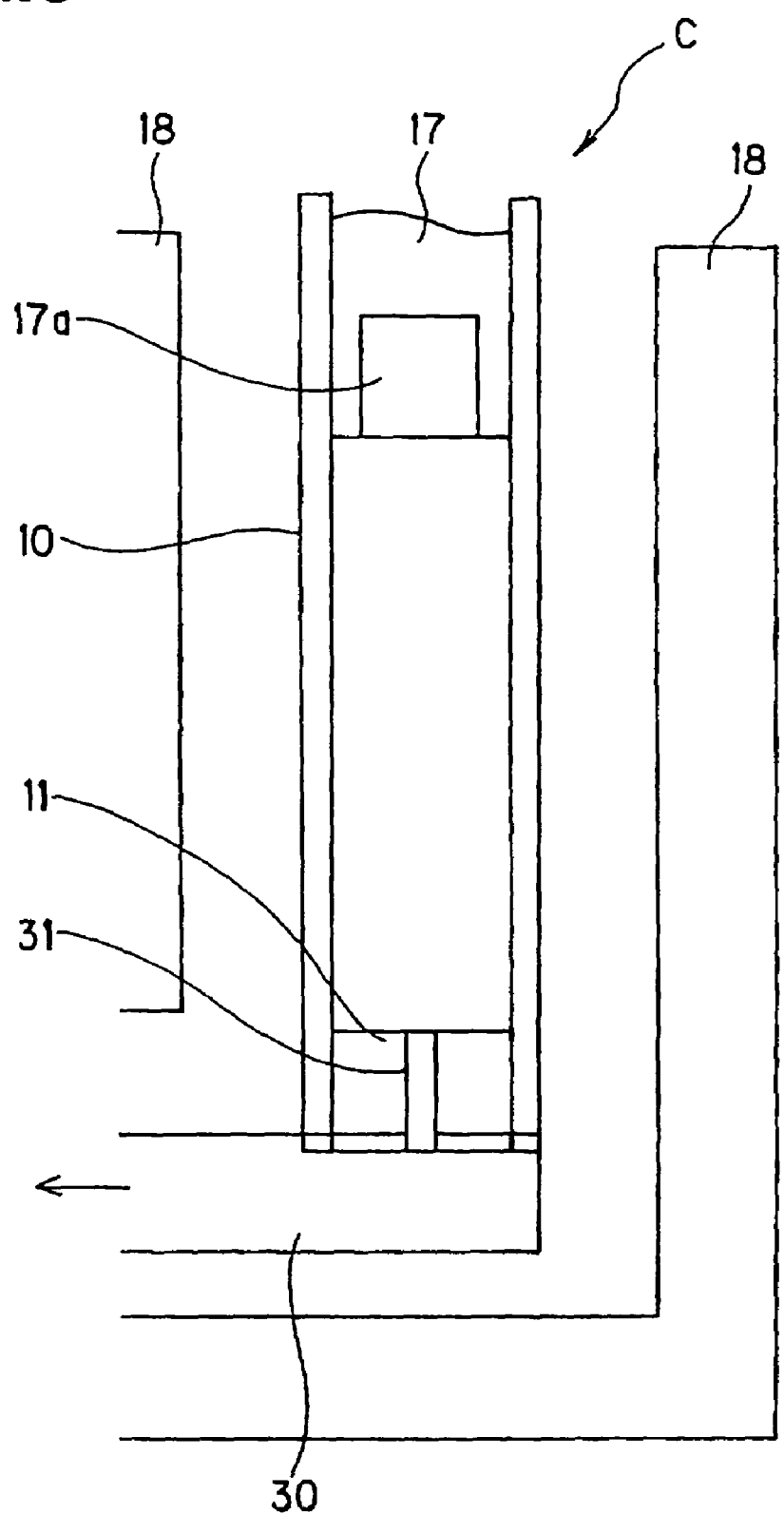
FIG. 9 is a partial outline cross-sectional drawing showing a use aspect of the fuel reservoir for a fuel cell of the third embodiment according to the present invention.
Figure 10:
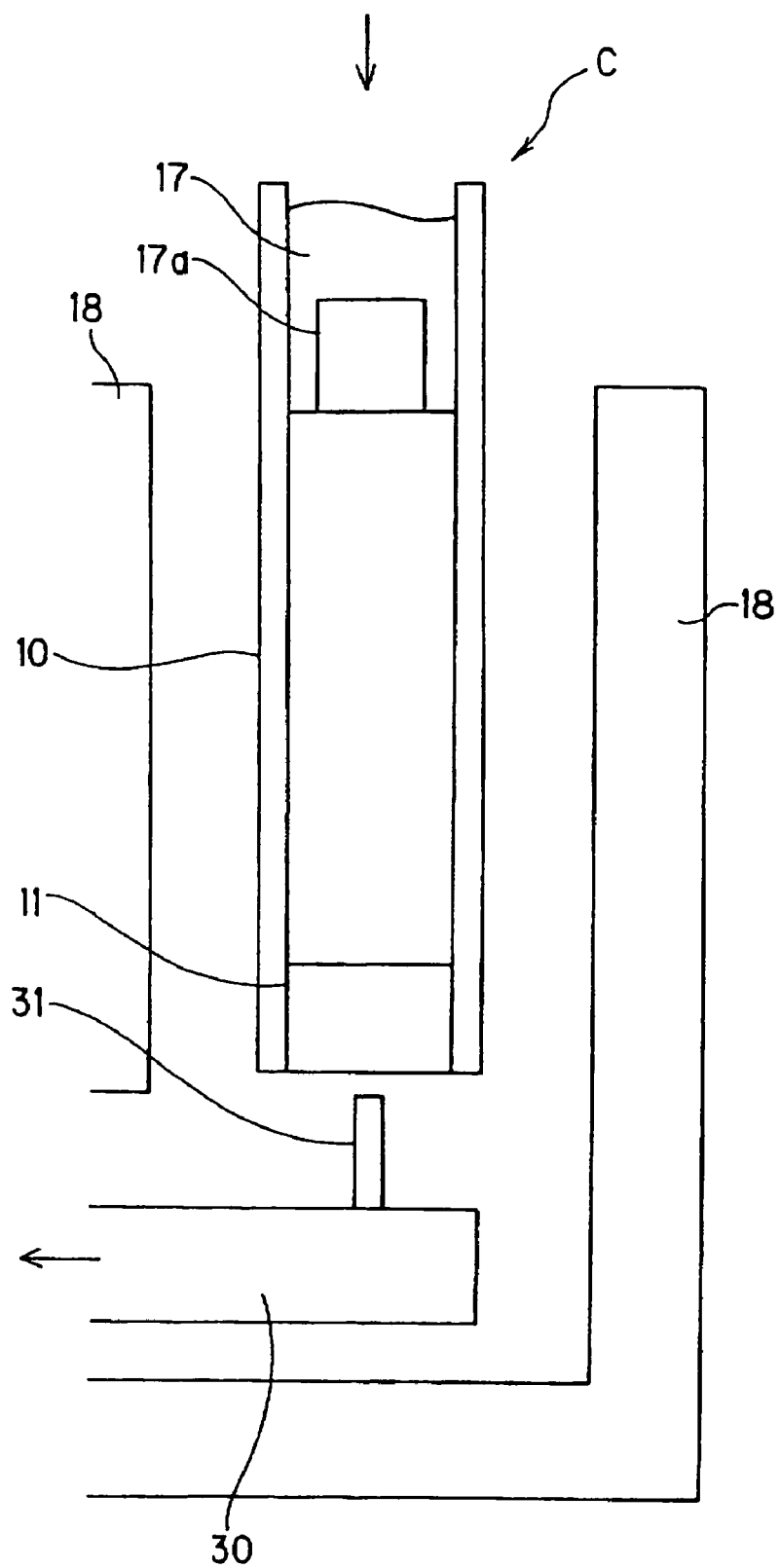
FIG. 10 is an outline cross-sectional drawing showing an aspect of the fuel reservoir for a fuel cell of FIG. 9 before use.

FIG. 9 and FIG. 10 show another embodiment (the third embodiment) of the fuel reservoir for a fuel cell according to the present invention, and they show another embodiment of a valve and another embodiment of connection between the fuel reservoir and a fuel cell main body.

The fuel reservoir C of the above third embodiment is different, as shown in FIG. 9 to FIG. 10, from the first embodiment described above in that it is connected with a liquid fuel-supplying member 30 via a liquid fuel-supplying tube 31 inserted into a valve 12, in that a follower auxiliary member 17a comprising a PP resin is installed in the inside of a follower 17 to improve followability of the follower when a large volume of a liquid fuel is stored and in that the valve assumes a structure in which the closed valve is opened by inserting the liquid fuel-supplying tube 31 connected with the fuel-supplying member 30. It is used in the same manner as in the first embodiment described above and exhibits the targeted effects.

Assumed is, though not illustrated, a structure in which a tip (arrow directions in FIG. 9 and FIG. 10) of the liquid fuel-supplying member 30 is connected in series or in parallel, as is the case with the first embodiment described above (FIG. 7), with unit cells 20.

The reservoir for a fuel cell according to the present invention shall not be restricted to the respective embodiments described above, and it can be modified to various extents within the technical concept of the present invention.

For example, the cylindrical unit cell 20 is used but may have different forms such as rectangular and tabular forms, and it may be joined in parallel as well as in series with the liquid fuel-supplying member 30.

The embodiment described above makes it possible to prevent foreign matters such as air from coming into a liquid fuel F stored directly in a fuel-storing vessel 10 from the periphery of the fuel-supplying tube 31 due to a change in barometric pressure and temperature, but it shall not specifically be restricted as long as the reservoir assumes a structure in which the liquid fuel is supplied to the liquid fuel-supplying member 30 by inserting the fuel-supplying tube 31.

Further, in the embodiment described above, the present invention has been explained as a direct methanol fuel cell, but the present invention shall not be restricted to the direct methanol fuel cell described above as long as it is a fuel reservoir for a fuel cell detachably connected to a fuel cell main body, wherein the above fuel reservoir is equipped with a fuel-storing vessel for storing a liquid fuel and a fuel discharge part, and the above fuel discharge part is equipped with a valve for sealing communication between the inside and the outside of the fuel-storing vessel. It can suitably be applied as well to a fuel cell of a reforming type. Further, when a liquid fuel of a large volume (for example, 100 ml or more) is charged and a fuel-storing vessel of a tube type is increased in a diameter, an amount of a follower can be increased to meet it or a follower auxiliary member can be inserted to make the follower to follow well without causing interruption.

Further, the fuel cell main body is constituted by constructing an electrolyte layer on the outer surface of a fuel electrode body comprising a fine porous carbonaceous body and constructing an air electrode layer on the outer surface of the electrolyte layer, but the fuel cell main body shall not specifically be restricted in a structure and may be, for example, a fuel cell main body assuming a constitution in which a unit cell obtained by forming respective layers of electrode/electrolyte/electrode on the surface of a base material which comprises a porous carbonaceous body having electric conductivity or a junction body obtained by joining two or more of the unit cells is provided and the surface of the electrode formed on the outer surface of the base material is exposed to air and in which the base material is impregnated with a liquid fuel via a fuel-supplying member.

EXAMPLES

Next, the present invention shall be explained in further details with reference to examples, but the present invention shall not be restricted to the examples described below.

Examples 1 to 4 and Comparative Example 1

Five kinds of fuel reservoirs which had a structure shown below and in which a valve in a fuel discharge part was different were prepared and filled with a liquid fuel (70 wt % methanol solution, specific gravity: 0.87) and a follower.

Examples 1 to 3 and Comparative Example 1

The liquid fuel: 2 g and the follower: 0.30 g

Example 4

The liquid fuel: 1 g and the follower: 0.15 g
Constitution of fuel-storing vessel: Tube 1
Tube 1: length 100 mm, outer diameter 8 mm, inner diameter 6 mm, polypropylene-made extruded tube Tube 2: length 100 mm, outer diameter 6 mm, inner diameter 4 mm, polypropylene-made extruded tube Examples 1 to 3 and Comparative Example 1: Tube 1 was used Example 4: Tube 2 was used Fuel Discharge Part 1 (Slit Valve, Based on FIG. 2)

Slit valve 1: length 3 mm (not including projection, projection 4 mm), major axis 5 mm, minor axis 4 mm, slit length 1.5 mm, made of butyl rubber.

This butyl rubber-made slit valve had a gas permeability of 0.1 mg/day/atm toward the liquid fuel of the 70 wt % methanol solution described above at 50° C. and 30% RH and a compression set of 10% prescribed in JIS K 6262-1997 (hereinafter same shall apply).

Adaptor 1: length 6 mm, outer diameter 6 mm, inner diameter 4 mm, inner diameter of the inlet for inserting fuel-supplying body 1.2 mm, polypropylene-made injection-molded article Stopper 1: length 2 mm, outer diameter 4 mm, inner diameter 3 mm, polypropylene-made injection-molded article Fuel Discharge Part 2 (Slit Valve, Based on FIG. 3)

Slit valve 2: length 3 mm (not including projection, projection 4 mm), major axis 5 mm, slit length 1.5 mm, made of butyl rubber.

This butyl rubber-made slit valve had a gas permeability of 0.1 mg/day/atm toward the liquid fuel of the 70 wt % methanol solution described above at 50° C. and 30% RH and a compression set of 10% prescribed in JIS K 6262-1997.

Adaptor 2: length 6 mm, outer diameter 6 mm, major axis of inner diameter 5 mm, minor axis 4 mm, inner diameter of the inlet for inserting a fuel-supplying body: 1.2 mm, polypropylene-made injection-molded article Stopper 2: length 2 mm, major axis of outer diameter 4 mm, minor axis of outer diameter 4 mm, major axis of inner diameter 4 mm, minor axis of inner diameter 3 mm, polypropylene-made injection-molded article Fuel Discharge Part 3 (Valve, Based on FIG. 4)

Figure 5:
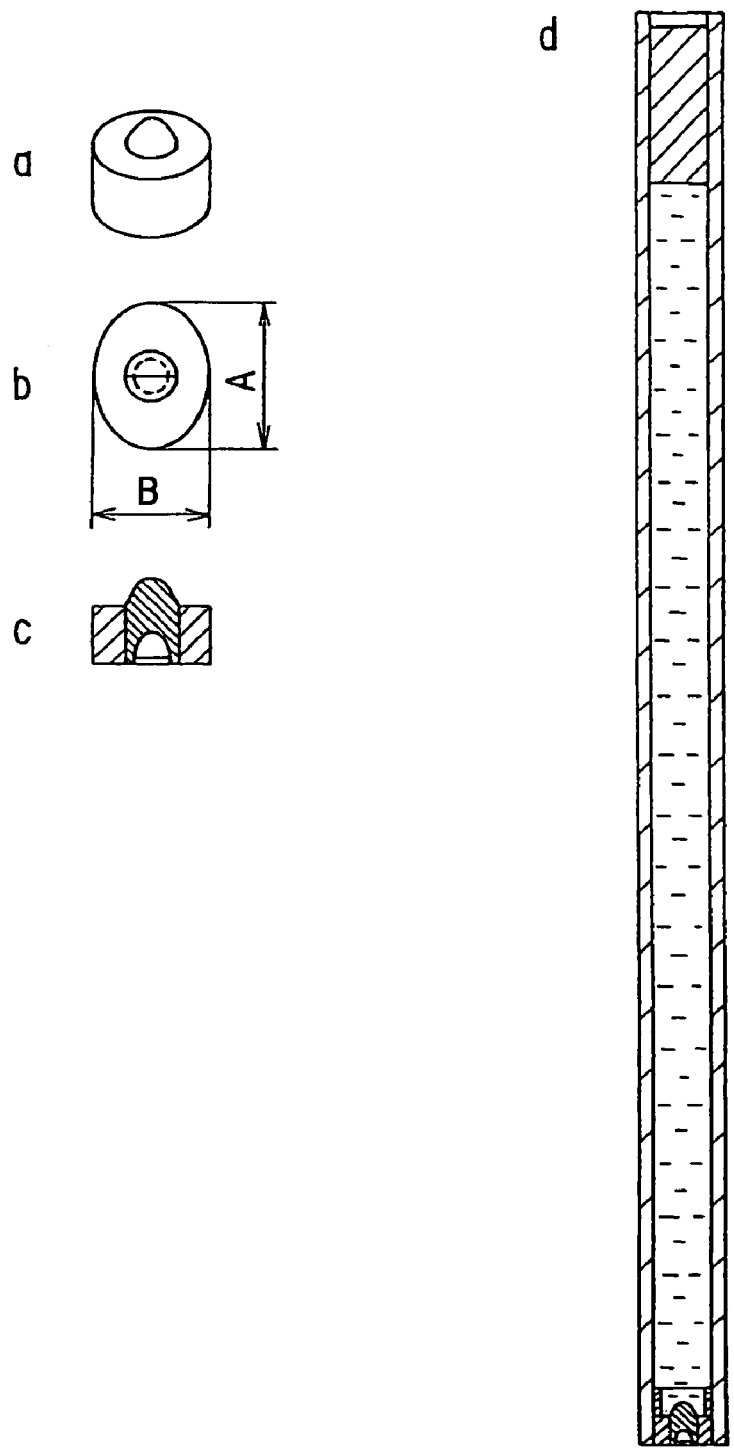
FIG. 5 (*a*) to (*d*) show the structure of a valve installed in the fuel discharge part of the first embodiment according to the present invention, wherein (a) is a perspective drawing of the valve; (b) is a plain view of the valve; (c) is a vertical cross-sectional drawing of the valve; and (d) is a vertical cross-sectional drawing showing an outline of the fuel reservoir in a state in which the valve is installed.

Length 10 mm, outer diameter 6 mm, inner diameter 1 mm,
Valve main body: made of polypropylene
Resilient body: stainless steel-made spring
Valve: made of polypropylene Fuel Discharge Part 4 (Slit Valve, Based on FIG. 5)

Slit valve 1: length 3 mm (not including projection, projection 4 mm), major axis 5 mm, minor axis 4 mm, slit length 1.5 mm, made of butyl rubber.

This butyl rubber-made slit valve had a gas permeability of 0.1 mg/day/atm toward the liquid fuel of the 70 wt % methanol solution described above at 50° C. and 30% RH and a compression set of 10% prescribed in JIS K 6262-1997.

Stopper 1: length 2 mm, outer diameter 4 mm, inner diameter 3 mm, polypropylene-made injection-molded article The slit valve 1 and the stopper 1 each described above were pressed directly into the storing vessel tube 2 to prepare a fuel discharge part 4.

Figure 6:
FIG. 6 (*a*) to (*h*) show the structure of a valve installed in the fuel discharge part in a comparative example, wherein (a) is a perspective drawing of the valve; (b) is a plain view of the valve; (c) is a vertical cross-sectional drawing of the valve; (d) is a plain view of an adaptor; (e) is a vertical cross-sectional drawing of the adaptor; (f) is a plain view of a state in which the valve is installed in the adaptor; (g) is a vertical cross-sectional drawing of a state in which the valve is installed in the adaptor; and (h) is a vertical cross-sectional drawing showing an outline of the fuel reservoir.
Figure 6:
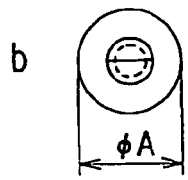
Figure 6:
Figure 6:
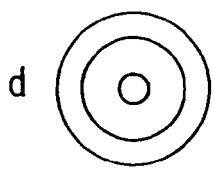
Figure 6:
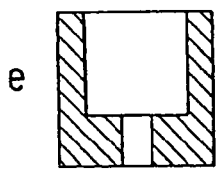
Figure 6:
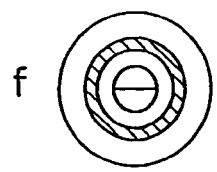
Figure 6:
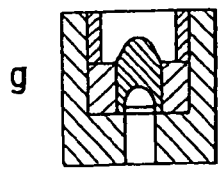
Figure 6:
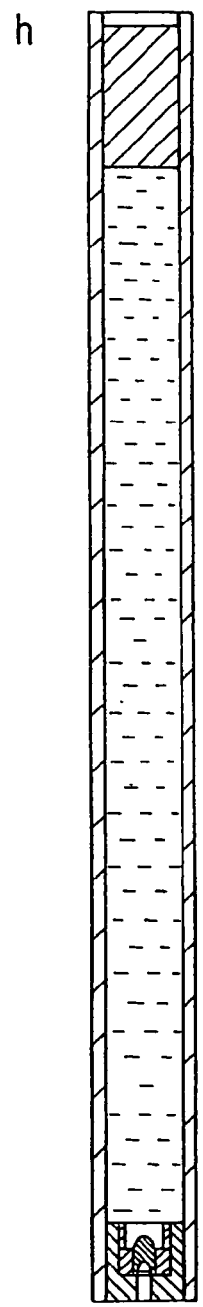

Fuel Discharge Part 5 (Slit Valve, based on FIG. 6)

Slit valve 3: length 3 mm (not including projections, projection 4 mm), outer diameter 4 mm, slit length 1.5 mm, made of butyl rubber.

This butyl rubber-made slit valve had a gas permeability of 0.1 mg/day/atm toward the liquid fuel of the 70 wt % methanol solution described above at 50° C. and 30% RH and a compression set of 10% prescribed in JIS K 6262-1997.

Adaptor 1: length 6 mm, outer diameter 6 mm, inner diameter 4 mm, inner diameter of the inlet for inserting a fuel-supplying body: 1.2 mm, polypropylene-made injection-molded article Stopper 1: length 2 mm, outer diameter 4 mm, inner diameter 3 mm, polypropylene-made injection-molded article Example 1: The fuel discharge part 1 was used
Example 2: The fuel discharge part 2 was used
Example 3: The fuel discharge part 3 was used
Example 4: The fuel discharge part 4 was used
Comparative Example 1: The fuel discharge part 5 was used Composition of the Follower A gelatinous follower (specific gravity: 0.90) having the following formulation was used.

| | |
|---|---|
| Mineral oil: Diana Process Oil MC-W90 (manufactured by Idemitsu Kosan Co., Ltd.) | 93 parts by weight |
| Hydrophobic silica: Aerosil R-974D (manufactured by Nippon Aerosil Co., Ltd.) | 6 parts by weight |
| Silicone base surfactant: SILWET FZ-2171 (manufactured by Nippon Unicar Co., Ltd.) | 1 part by weight |

Fuel reservoirs having the fuel discharge parts of the constitutions described above were prepared and subjected to the following tests.

Test 1: Fuel Discharge Property

A stainless steel hollow tube having a diameter of 1.0 mm (diameter of the hollow part: 0.80 mm) which was a fuel-supplying body was inserted into a slit valve 12 or a valve 60 which was installed at the fuel discharge part of the fuel-storing vessel tube described above to evaluate the respective discharge properties in the fuel reservoirs.

In Examples 1 to 4 and Comparative Example 1, it has been found that all of the liquid fuel filled can be discharged. Further, it has been found that the respective followers can follow well.

Test 2: Fuel Storing Property, Initial Stage

The fuel reservoirs having the constitutions described above were prepared to confirm leaking of the fuel.

The fuel discharge part was turned downward and left standing vertically at room temperature for one day, and then a change in the weight was measured.

Evaluation:
○: weight change of less than 10%
X: weight change of 10% or more

In Examples 1 to 4 and Comparative Example 1, it has been found that a change in the weight is less than 10% and that the fuel storing property is good.

Test 3: Fuel Storing Property, Hot Condition

The fuel reservoirs having the constitutions described above were prepared to confirm leaking of the fuel.

The fuel discharge part was turned downward and left standing vertically at 50° C. and 60% RH for one day, and then a change in the weight was measured.

Evaluation:
○: weight change of less than 10%
X: weight change of 10% or more

In Examples 1 to 4 and Comparative Example 1, it has been found that a change in the weight is less than 10% and that the fuel storing property is good.

Test 4: Fuel Storing Property, Pressurized Condition

The fuel reservoirs having the constitutions described above were prepared and pressurized (100 kPa) from a side opposite to the fuel discharge part by compressed air to confirm leaking of the fuel.

Evaluation:
◯: no leaking of the fuel
X: the fuel was ejected

In Examples 1 to 4, it has been found that the fuel does not leak and that the fuel storing property is good. In Comparative Example 1, however, it has been found that the fuel is ejected and that a problem is involved in the storing property under a pressurized condition.

The constitutions of the fuel reservoirs in the examples and the comparative example are shown in Table 1, and the results of the tests 1 to 4 are shown in Table 2.

TABLE 1

|  | Fuel-storing vessel | Fuel | Follower | Fuel discharge part |
|---|---|---|---|---|
| Example 1 | Tube 1 | 2 g | 0.30 g | Discharge part 1 |
| Example 2 | Tube 1 | 2 g | 0.30 g | Discharge part 2 |
| Example 3 | Tube 1 | 2 g | 0.30 g | Discharge part 3 |
| Example 4 | Tube 2 | 1 g | 0.15 g | Discharge part 4 |
| Comparative Example 1 | Tube 1 | 2 g | 0.30 g | Discharge part 5 |

TABLE 2

|  | Test 1 | Test 2 | Test 3 | Test 4 |
|---|---|---|---|---|
| Example 1 | ◯ | ◯ | ◯ | ◯ |
| Example 2 | ◯ | ◯ | ◯ | ◯ |
| Example 3 | ◯ | ◯ | ◯ | ◯ |
| Example 4 | ◯ | ◯ | ◯ | ◯ |
| Comparative Example 1 | ◯ | ◯ | ◯ | X |

INDUSTRIAL APPLICABILITY

The liquid fuel reservoir of the present invention can be used for storing fuel in a small-sized fuel cell used as an electric power source for portable electronic appliances such as cellular phones, note type personal computers and PDA.

What is claimed is:

1. A fuel reservoir for a fuel cell detachably connected with a fuel cell main body, wherein the fuel reservoir is equipped with a fuel-storing vessel for storing a liquid fuel, a fuel discharge part and a gelatinous follower which seals the liquid fuel stored and which moves as the liquid fuel is consumed, and the fuel discharge part is equipped with a valve which seals communication between the inside and the outside of the fuel-storing vessel and into which a liquid fuel-supplying member is inserted to communicate the inside of the fuel-storing vessel with the fuel cell main body, whereby formed is a communicating part in which the liquid fuel in the inside of the fuel-storing vessel is supplied to the fuel cell main body.

2. The fuel reservoir for a fuel cell as described in claim 1, wherein the valve comprises an elastic material; the communicating part is a slit, and compressing force works in a direction in which the slit is closed.

3. The fuel reservoir for a fuel cell as described in claim 2, wherein the valve has an elliptic form in a cross section; a slit is provided in a minor axis direction of the valve, and a major axis of the valve is compressed to a shorter length than the length thereof.

4. The fuel reservoir for a fuel cell as described in claim 3, wherein the valve having the elliptic form is pressed into an elliptic vessel having a shorter major axis than a major axis of the valve or a circular vessel having a shorter diameter than a major axis of the valve to compress a major axis direction of the valve.

5. The fuel reservoir for a fuel cell as described in claim 2, wherein the valve has a circular form in a cross section and is provided with a slit; the valve is pressed into an elliptic vessel having a shorter minor axis than a diameter of the valve so that a line formed by the slit is consistent with a major axis direction of the ellipse, whereby the direction rectangular to the slit is compressed to a shorter length than the original diameter of the valve.

6. The fuel reservoir for a fuel cell as described in claim 5, wherein the vessel into which the valve is pressed is a valve-receiving part provided in the fuel-storing vessel.

7. The fuel reservoir for a fuel cell as described in claim 5, wherein the vessel into which the valve is pressed is a valve adaptor, and a composite in which the valve is installed in the valve adaptor is loaded in the fuel-storing vessel.

8. The fuel reservoir for a fuel cell as described in claim 2, wherein the valve comprises a material having low gas permeability toward the liquid fuel and comprises a material having a compression set of 20% or less prescribed in JIS K 6262-1997.

9. The fuel reservoir for a fuel cell as described in claim 8, wherein the material of the valve is any of butyl rubber, halogenated butyl rubber and acrylonitrile-butadiene rubber.

10. The fuel reservoir for a fuel cell as described in claim 1, wherein a convex projection is formed in the valve toward the inside of the fuel-storing vessel.

11. The fuel reservoir for a fuel cell as described in claim 1, wherein a valve member of the valve is closed by a resilient body and opened by inserting the liquid fuel-supplying member.

12. The fuel reservoir for a fuel cell as described in claim 1, wherein the liquid fuel is at least one selected from the group consisting of a methanol solution, an ethanol solution, dimethyl ether, formic acid, hydrazine, an ammonia solution, ethylene glycol, a saccharide aqueous solution and a sodium boron hydride aqueous solution.

13. The fuel reservoir for a fuel cell as described in claim 1, wherein the fuel cell main body assumes a structure in which plural unit cells each of which is formed by constructing an electrolyte layer on the outer surface of a fuel electrode body and constructing an air electrode layer on the outer surface of the electrolyte layer are joined and in which the fuel-supplying member connected with the fuel reservoir is connected with the unit cells to supply the liquid fuel.

14. The fuel reservoir for a fuel cell as described in claim 4, wherein the vessel into which the valve is pressed is a valve-receiving part provided in the fuel-storing vessel.

15. The fuel reservoir for a fuel cell as described in claim 4, wherein the vessel into which the valve is pressed is a valve adaptor, and a composite in which the valve is installed in the valve adaptor is loaded in the fuel-storing vessel.

* * * * *